Sept. 16, 1941.  A. CERVENY  2,256,371
BRAKE INDICATOR
Filed June 27, 1939
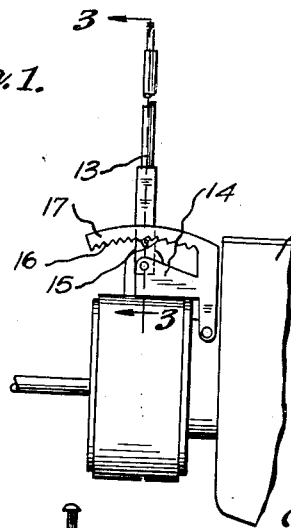
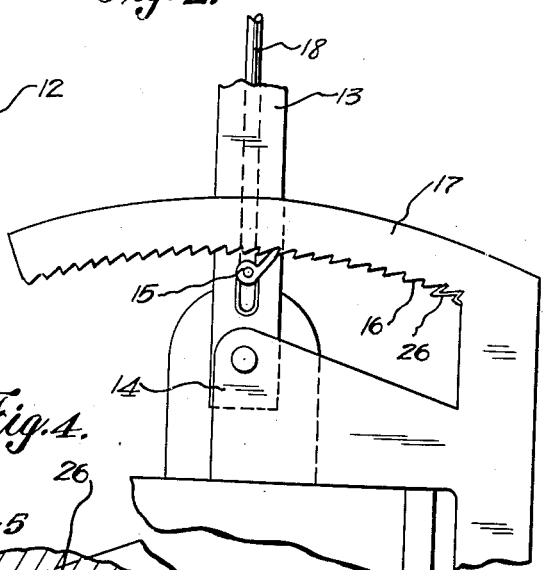
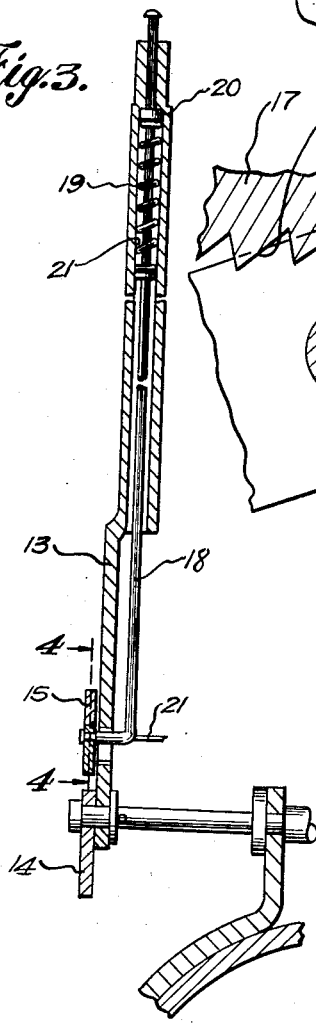
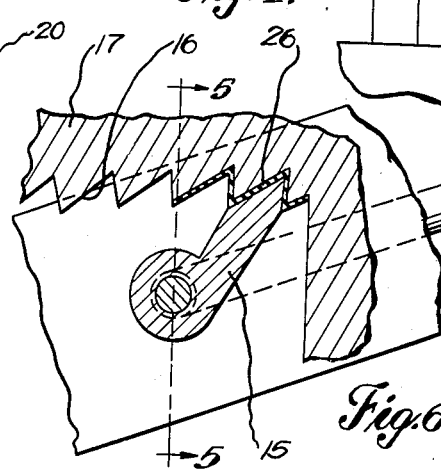
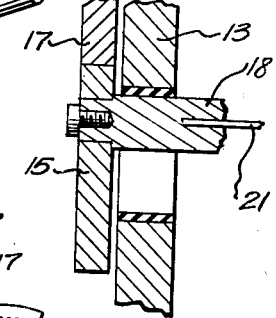
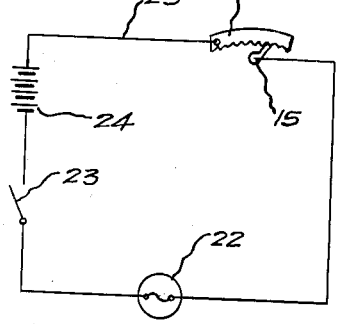
INVENTOR.
ALBINA CERVENY.
BY
ATTORNEY.

Patented Sept. 16, 1941

2,256,371

UNITED STATES PATENT OFFICE 2,256,371

BRAKE INDICATOR

Albina Cerveny, Highland Park, Mich.

Application June 27, 1939, Serial No. 281,428

1 Claim.  (Cl. 200—59)

My invention relates to a new and useful improvement in a brake indicating device adapted for use on vehicles particularly for indicating when the emergency brake is applied. Experience has shown that the operator of an automobile frequently, after stopping and applying the emergency or parking brake, will, when starting the car sometime later, drive the vehicle with the emergency or parking brake applied. This results in a wearing out of the brake lining, places an increased load on the engine and lessens the efficiency of the same; while, at the same time, the safety of the operation of the vehicle is impaired.

It is an object of the present invention to provide a simple and effective means for indicating to the driver of the vehicle, immediately upon the starting of the engine, that the emergency or parking brake is applied, thus serving as a means of avoiding the disadvantages and undesirable results referred to.

It is another object of the present invention to provide a device of this class which will be simple in structure, economical of manufacture, durable, compact, easily and quickly installed, and highly efficient in use.

It is another object of the present invention to provide, in a device of this class, an electrically operated warning mechanism which will function immediately upon the closing of the ignition circuit of the engine while the emergency or parking brake is applied.

Other objects will appear hereinafter.

The invention consists in the arrangement and construction of parts hereinafter described and claimed.

The invention will be best understood by a reference to the accompanying drawing which forms a part of this specification and in which—

Fig. 1 is a fragmentary elevational view of an engine showing the invention applied.

Fig. 2 is an elevational view of an engine showing the invention applied and slightly enlarged.

Fig. 3 is a fragmentary sectional view taken on line 3—3 of Fig. 1 with parts broken away and slightly enlarged.

Fig. 4 is a fragmentary sectional view taken on line 4—4 of Fig. 3 slightly enlarged.

Fig. 5 is a fragmentary sectional view taken on line 5—5 of Fig. 4.

Fig. 6 is a diagrammatical view illustrating the wiring used in the invention.

In the drawing I have illustrated the invention used with an engine 12 having an emergency or parking brake operated by rockable lever 13 which is pivoted to a lug 14 and carries a dog 15 adapted to ride over the teeth 16 of a ratchet segment 17. The dog 15 is normally held in engagement with the teeth 16 by means of the rod 18 pressed by the spring 19 which engages at one end the collar 20 and at the other end the bottom of the bore 21 formed in the upper portion of the lever 13. This rod 18 projects beyond the upper end of the lever 13.

An electrical wire 21 is connected to the dog 15, and also through a light bulb 22 and the ignition switch 23 to one side of the battery 24. The other side of the battery 24 is connected by the wire 25 to the segment 17. This connection is usually effected by a grounding. The light bulb 22 may, of course, be replaced by a suitable electrical bell or other type of alarm. If a light bulb is used, it would be mounted on the instrument board or in any other position where it would be visible to the operator of the vehicle. A number of teeth are faced with a layer of insulation 26.

The construction and operation of the invention is such that when the brake is released, the dog 15 will engage the insulation 26 and the circuit to the alarm device 22 will be broken. When the brake is applied, the dog 15 will ride off of the insulation 26 and engage the teeth 16, which would serve to close the circuit through the alarm device 22 when the switch 23 is closed. Consequently, after applying the parking brake, when the operator closes the ignition switch 23, the circuit to the alarm device 22 would be closed and the light bulb would light or the electric buzzer or bell would sound, thus warning the operator of the vehicle that the parking or emergency brake is still applied. When the brake is released the circuit to the alarm device 22 would be broken through the engagement of the dog 15 with the insulation 26. In this way the operator would always be warned before starting the vehicle that the parking or emergency brake was applied.

It is recognized that various methods of construction might be resorted to in order to carry out the purposes and intents of the present invention and it is intended that such variations and modifications should be embraced within the scope of the appended claim.

What I claim as new is:

In a device of the class described, a rockable brake-applying lever movable to brake-applying position and to brake-releasing position; a pawl carried by said lever and interposed in an electric circuit; a ratchet segment interposed in said circuit and engageable with said pawl for securing said lever in various positions of rocked movement, the engagement of said pawl with said segment effecting a closing of said circuit; and a layer of insulation covering some of the teeth of said segment for preventing contact of said pawl with said segment upon movement of said brake-applying lever to brake-releasing mechanism for maintaining said circuit broken.

ALBINA CERVENY.